United States Patent
Giroud et al.

(10) Patent No.: US 9,850,958 B2
(45) Date of Patent: Dec. 26, 2017

(54) STEERING COLUMN SUPPORT BEARING

(71) Applicant: Koyo Bearings North America LLC, Westflake, OH (US)

(72) Inventors: Vincent Giroud, Mutzig (FR); Fabrice Lemaitre, Ribeauville (FR)

(73) Assignee: Koyo Bearings North America LLC, Westlake, OH (US)

( * ) Notice: Subject to any disclaimer, the term of this patent is extended or adjusted under 35 U.S.C. 154(b) by 60 days.

(21) Appl. No.: 14/774,734

(22) PCT Filed: Mar. 13, 2013

(86) PCT No.: PCT/US2013/030749
§ 371 (c)(1),
(2) Date: Sep. 11, 2015

(87) PCT Pub. No.: WO2014/142821
PCT Pub. Date: Sep. 18, 2014

(65) Prior Publication Data
US 2016/0025144 A1 Jan. 28, 2016

(51) Int. Cl.
*F16C 41/04* (2006.01)
*B62D 1/16* (2006.01)
(Continued)

(52) U.S. Cl.
CPC .............. *F16C 41/04* (2013.01); *B62D 1/16* (2013.01); *F16C 25/083* (2013.01);
(Continued)

(58) Field of Classification Search
CPC ...... F16C 25/083; F16C 35/073; F16C 41/04; F16C 2326/24; B62D 1/16
See application file for complete search history.

(56) References Cited

U.S. PATENT DOCUMENTS

| | | | |
|---|---|---|---|
| 2,232,473 A * | 2/1941 | Pulleyblank | B62D 1/16 384/518 |
| 2,856,247 A | 10/1958 | Anderson | |

(Continued)

FOREIGN PATENT DOCUMENTS

| | | | |
|---|---|---|---|
| DE | 3808556 A1 * | 9/1989 | ........... B62D 1/16 |
| DE | 19952119 | 5/2001 | |

(Continued)

OTHER PUBLICATIONS

International Search Report and Written Opinion dated Dec. 20, 2013 for PCT/US2013/030749.
(Continued)

*Primary Examiner* — Phillip A Johnson
(74) *Attorney, Agent, or Firm* — Nelson Mullins Riley & Scarborough LLP

(57) ABSTRACT

A bearing assembly (100) for supporting a steering shaft within a steering column tube including an outer bearing ring (120) defining an outer raceway (122), an inner bearing ring (130) defining an inner raceway (132), a plurality of roller elements (154) disposed between the inner raceway and the outer raceway, a support cone (160) defining an inner face and an outer surface, the support cone being disposed radially inwardly of, and in contact with, the inner bearing ring, and a biasing element (180) disposed adjacent the inner surface of the support cone. The biasing element exerts force radially-outwardly against the inner surface of the support cone.

19 Claims, 4 Drawing Sheets

(51) Int. Cl.
*F16C 35/073* (2006.01)
*F16C 25/08* (2006.01)
*F16C 19/16* (2006.01)

(52) U.S. Cl.
CPC .......... *F16C 35/073* (2013.01); *F16C 19/163* (2013.01); *F16C 2326/24* (2013.01)

(56) References Cited

U.S. PATENT DOCUMENTS

| | | | | |
|---|---|---|---|---|
| 5,531,526 | A * | 7/1996 | Labedan | B62D 1/16 384/518 |
| 6,179,473 | B1 * | 1/2001 | Ponson | B62D 1/16 384/517 |
| 6,227,715 | B1 | 5/2001 | Erhardt et al. | |
| 6,375,360 | B1 * | 4/2002 | Weisskopf | F16C 19/163 384/517 |
| 8,967,969 | B2 | 3/2015 | Boston et al. | |
| 2010/0308569 | A1 | 12/2010 | Delos | |

FOREIGN PATENT DOCUMENTS

| | | |
|---|---|---|
| DE | 102008049856 | 4/2010 |
| DE | 102010014453 | 6/2011 |
| EP | 1184583 | 3/2002 |
| EP | 1184583 B1 | 5/2005 |
| EP | 1988002 | 11/2008 |
| EP | 2249050 | 11/2010 |
| FR | 2095778 | 2/1972 |
| FR | 2779787 | 12/1999 |
| FR | 2789134 | 8/2000 |
| FR | 2798170 | 3/2001 |
| FR | 2798171 | 3/2001 |
| FR | 2869081 | 10/2005 |
| FR | 2934654 | 2/2010 |
| JP | S5729471 U | 2/1982 |
| JP | 2002130266 A | 5/2002 |
| JP | 2010260538 A | 11/2010 |
| JP | 2013501198 A | 1/2013 |
| WO | 03095853 | 11/2003 |
| WO | 2011020656 | 2/2011 |
| WO | 2011023485 | 3/2011 |
| WO | 2011036997 | 3/2011 |
| WO | 2012007221 | 1/2012 |

OTHER PUBLICATIONS

Office Action for Japanese Patent Application No. 2016-500034 dated Oct. 27, 2016.
Notice of Preliminary Rejection for Korean Patent Application No. 10-2015-7027876 dated Oct. 4, 2016.
Office Action dated Dec. 2, 2016 for Chinese Application No. 201380075779.7.
EPO Communication for European Application No. 13713622.2 dated Jun. 28, 2017.

* cited by examiner

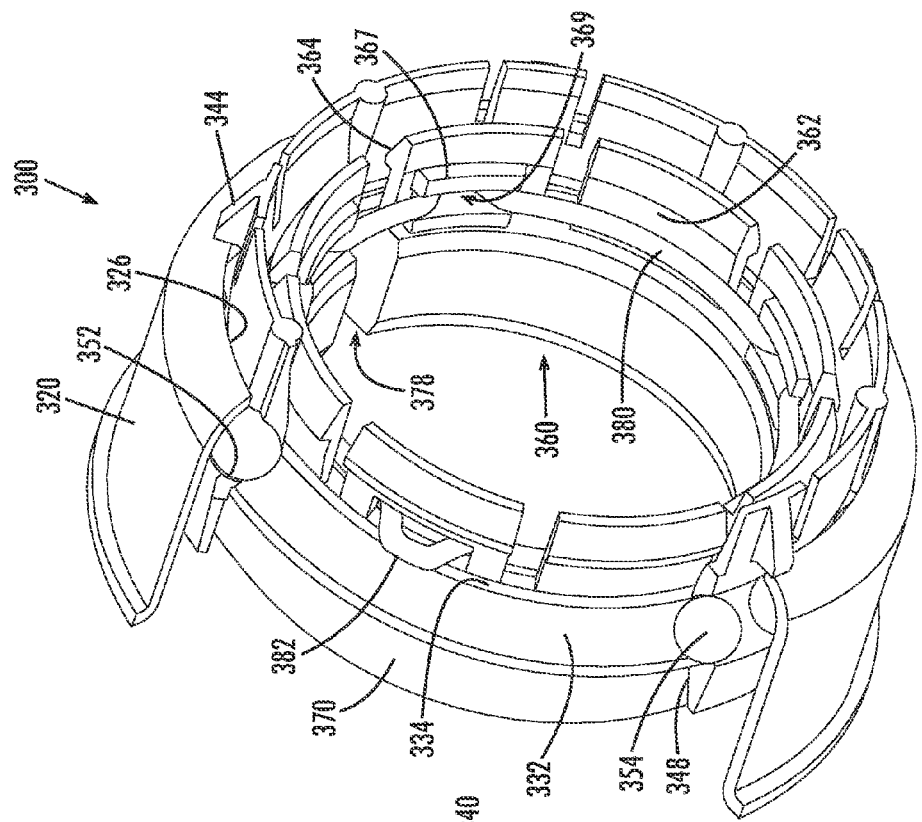
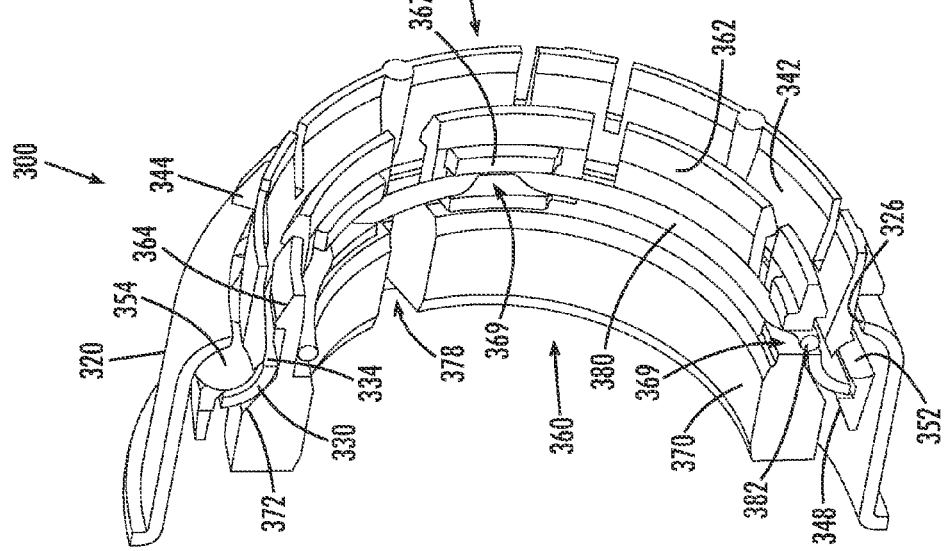

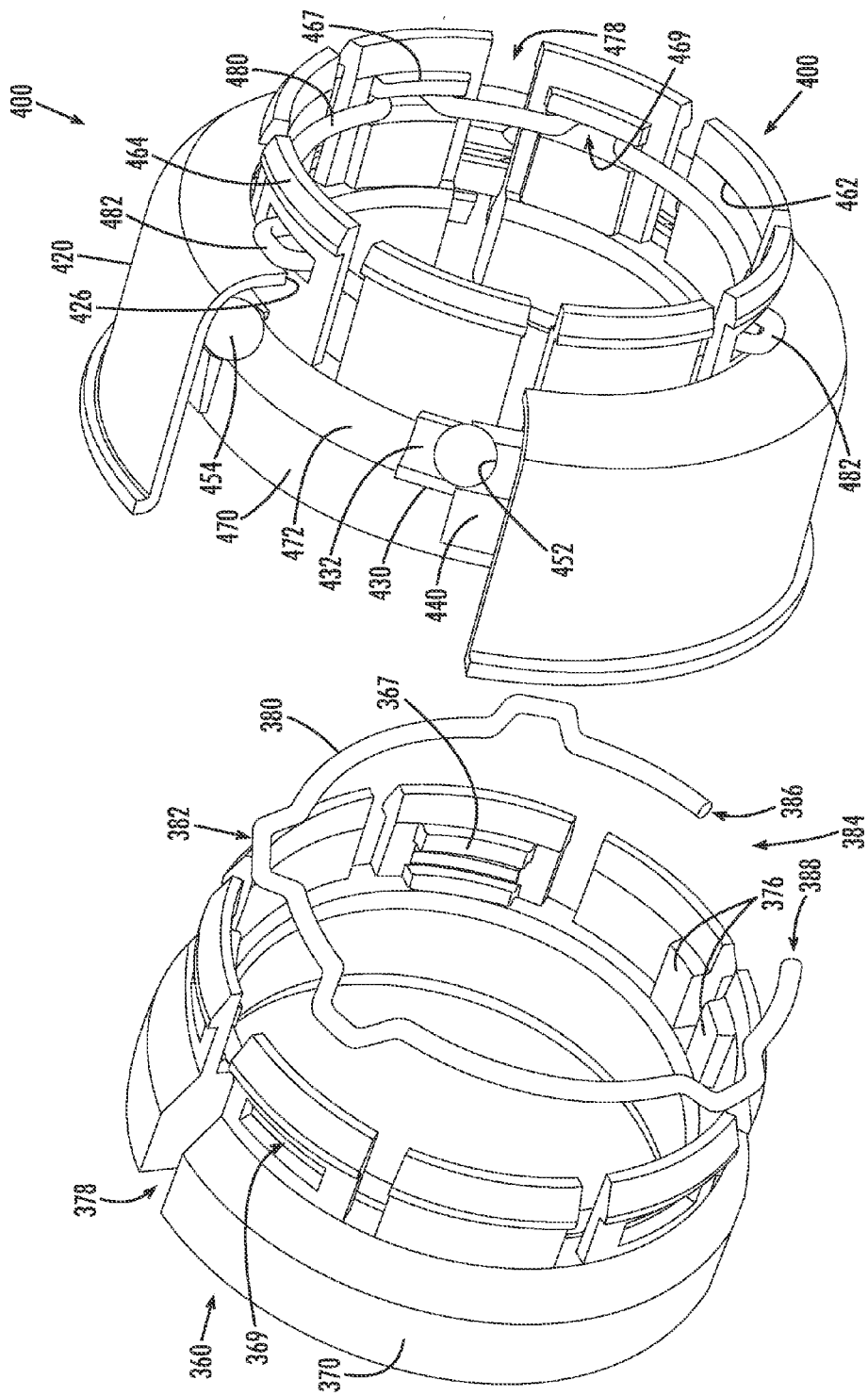

STEERING COLUMN SUPPORT BEARING

FIELD OF THE INVENTION

The present invention relates generally to roller bearings. More particularly, the present invention relates to a roller bearing for supporting a steering column of a steering system.

BACKGROUND OF THE INVENTION

Roller bearings for supporting steering shafts within a steering column assembly are well known. Many existing such bearings include an inner race, an outer race, a plurality of roller elements positioned within a cage therebetween, and a thrust cone that serves to connect the steering shaft to the roller bearing, which is in turn press-fit within the column tube of the assembly. Often, the thrust cones in these bearings also serve to help insure both the inner race and outer race remain secured, such as with clips, to the bearing's cage by exerting an outward force on the inner race, thereby unitizing the components of the bearing assembly for both shipping and assembly purposes. However, it is not uncommon for these bearings to become disassembled during shipping and assembly due to insufficient outward radial force being exerted by the thrust cone.

The present invention recognizes and addresses considerations of prior art constructions and methods.

SUMMARY OF THE INVENTION

One embodiment of a steering column support bearing in accordance with the present disclosure is a bearing assembly for supporting a steering shaft within a steering column tube, including an outer bearing ring defining an outer raceway, an inner bearing ring defining an inner raceway, a plurality of roller elements disposed between the inner raceway and the outer raceway, a support cone defining an inner surface and an outer surface, the support cone being disposed radially inwardly of, and in contact with, the inner bearing ring, and a biasing element disposed adjacent the inner surface of the support cone. The biasing element exerts force radially-outwardly against the inner surface of the support cone.

Another embodiment of a steering column support bearing in accordance with the present disclosure is a bearing assembly for supporting a steering shaft within a steering column tube, including an outer bearing ring defining an innermost perimeter and outer raceway, an inner bearing ring defining an innermost perimeter and inner raceway, a plurality of roller elements disposed between the inner raceway and the outer raceway, a bearing cage having an intermediate portion defining a plurality of roller pockets, each roller pocket receiving one of said plurality of roller elements, a support cone defining an inner surface and an outer surface, the support cone being disposed radially inwardly of, and in contact with, the inner bearing ring, and a biasing element disposed adjacent the inner surface of the support cone. The biasing element exerts force radially-outwardly against the inner surface of the support cone.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which:

FIG. 3 is a perspective, cross-sectional view of a third embodiment of a steering column bearing in accordance with the present disclosure;

FIG. 4 is a partial, cross-sectional view of the steering column support bearing as shown in FIG. 3;

FIG. 5 is a perspective view of the thrust cone and snap ring of the steering column support bearing shown in FIG. 3;

FIG. 6 is a perspective, cross-sectional view of a fourth embodiment of a steering column bearing in accordance with the present disclosure.

Figure 2:
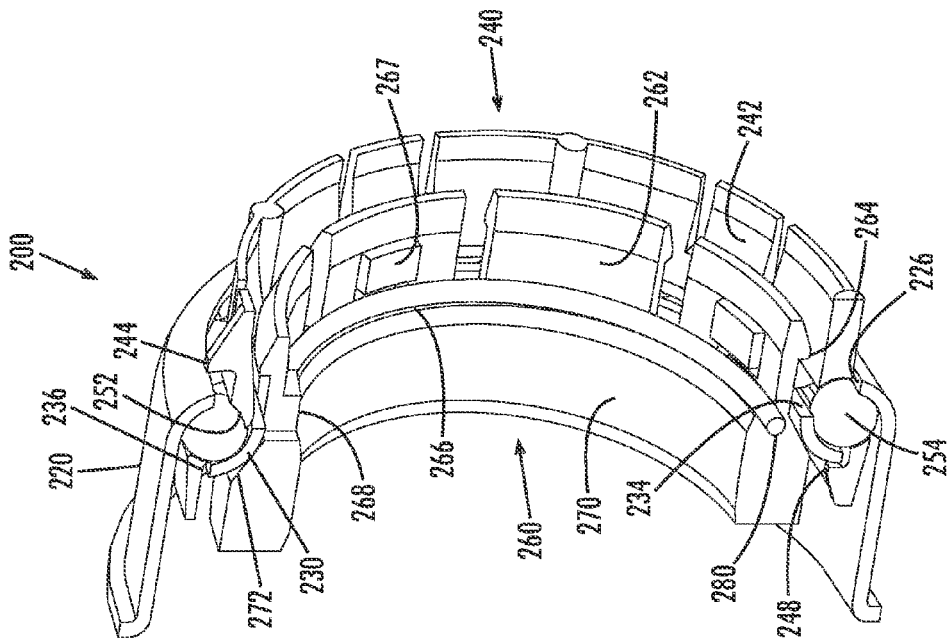
FIG. 2 is a perspective, cross-sectional view of a second embodiment of a steering column bearing in accordance with the present disclosure.

Repeat use of reference characters in the present specification and drawings is intended to represent same or analogous features or elements of the invention according to the disclosure.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 1:
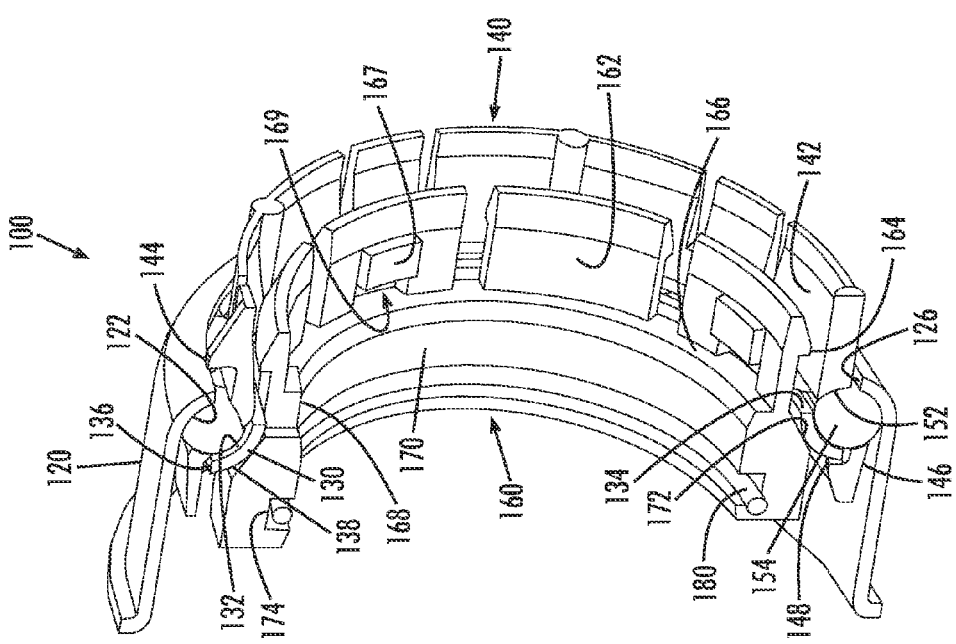
FIG. 1 is a perspective, cross-sectional view of a first embodiment of a steering column support bearing in accordance with the present disclosure.

Referring now to the figures, as shown in FIG. 1, an embodiment of a steering column support bearing assembly 100 in accordance with the present disclosure includes an outer bearing ring 120 defining an outer raceway 122, an inner bearing ring 130 defining an inner raceway 132, a cage 140 defining a plurality of roller pockets 152, and a plurality of roller elements 154, each roller element 154 being rotatably received by a corresponding roller pocket 152. Roller elements 154 are rotatably received between, and in rolling contact with, outer raceway 122 and inner raceway 132. Additionally, a support cone 160 and corresponding spring ring 180 are disposed radially inwardly of inner bearing ring 130 and are configured to exert a radially outwardly directed biasing force to assist in unitizing outer bearing ring 120, inner bearing ring 130 and cage 140.

As discussed in greater detail below, in the embodiment shown, cage 140 includes a first plurality of clips 144 depending radially outwardly therefrom to axially retain outer bearing ring 120 on cage 140, and a second plurality of clips 148 depending radially inwardly from cage 140 to axially retain inner bearing ring 130 relative to cage 140. Cage 140 is preferably constructed of a material that exhibits resiliency such as, but not limited to, polyoxymethylene (POM), polyamide, acetal, etc. As such, first and second clips 144 and 148, respectively, are similarly resilient. In addition, a third plurality of clips 164 depend radially outwardly from support cone 160, third clips 164 serving to axially retain support cone 160 relative to inner bearing race 130 and, therefore, cage 140. Similarly to cage 140, support cone 160 is constructed of a material that exhibits resiliency such as, but not limited to, polyoxymethylene (POM), polyamide, acetal, etc. Therefore the plurality of third clips 164 are also resilient. Further, spring ring 180 is received in an annular groove 174 defined by an inner surface of support cone 160. Spring ring 180 is configured to exert a biasing force radially outwardly on the inner surface of support cone 160, thereby enhancing the engagement of support cone 160 with inner bearing race 130 and, subsequently, its axial retention relative thereto by the plurality of third clips 164. Preferably, spring ring 180 is constructed of spring steel. However, alternate metals can be used so long as they exhibit proper resiliency.

As shown, the outer surface of outer bearing ring 120 is configured so that outer bearing ring 120 is slidably receivable within a corresponding steering column tube (not shown), whereas a portion of the outer bearing ring's inner surface defines outer raceway 122, outer raceway 122 terminating at an innermost perimeter 126 of the outer bearing ring. The previously discussed plurality of first clips 144 of cage 140 depend radially outwardly from a front wall 142 of cage 140, and the outermost portion of each first clip 144 extends outwardly beyond innermost perimeter 126 of outer bearing ring 120. Preferably, front wall 142 of cage 140 is formed by a plurality of semi-cylindrical wall segments that are separated by axially extending gaps disposed therebetween. As such, as front wall 142 of cage 140 is pushed axially through a bore defined by innermost perimeter 126 of outer bearing ring 120, each segment of front wall 142 is biased radially inwardly as each corresponding first clip 144 is cammed inwardly by engagement with innermost perimeter 126. Once the plurality of first clips 144 have moved axially beyond innermost perimeter 126 of outer bearing ring 120, each corresponding segment of the cage's front wall 142 returns to its original, unbiased position so that cage 140 is axially retained relative to outer bearing ring 120 by the plurality of first clips 144.

As shown, inner raceway 132 extends from an innermost perimeter 134 to an outermost perimeter 136 of inner bearing ring 130, as does its outer surface 138. The previously discussed plurality of second clips 148 of cage 140 depend radially inwardly from a rear wall 146 of cage 140, and the innermost portion of each second clip 148 extends inwardly beyond outermost perimeter 136 of inner bearing ring 130. Similarly to front wall 142, rear wall 146 can be formed by a plurality of semi-cylindrical wall segments that are separated by axially extending gaps disposed therebetween. As such, as inner bearing ring 130 is axially received within the rear wall portion of cage 140, each segment of rear wall 146 is biased radially outwardly as each corresponding second clip 148 is cammed outwardly by engagement with outermost perimeter 136 of inner bearing ring 130. Once outermost perimeter 136 has moved axially beyond the plurality of second clips 148, each corresponding segment of the cage's rear wall 146 returns to its original, unbiased position, thereby axially retaining inner bearing ring 130 relative to cage 140.

As previously noted, the plurality of third clips 164 depend radially outward from a front wall 162 of support cone 160. The outermost portion of each third clip 164 extends outwardly beyond innermost perimeter 134 of inner bearing ring 130. Similarly to the front and rear walls of cage 140, front wall 162 of support cone 160 is formed by a plurality of semi-cylindrical wall segments that are separated by axially extending gaps disposed therebetween. As such, as front wall 162 of support cone 160 is pushed axially through a bore defined by innermost perimeter 136 of inner bearing ring 130, each segment of front wall 162 is biased radially inwardly as each corresponding third clip 164 is cammed inwardly by the inner bearing ring's innermost perimeter 136. Once the plurality of third clips 164 have moved axially beyond innermost perimeter 136, each corresponding segment of the support cone's front wall 162 returns to its original, unbiased position. As such, support cone 160 is axially retained relative to inner bearing ring 130, which is axially retained relative to cage 140, which in turn axially retains outer bearing ring 120, meaning all components of the bearing assembly are unitized.

Additionally, although not shown, the present support cone 160 includes a gap, similar to gap 378 of support cone 360 shown in FIG. 6, that extends axially along its length. The gap allows the overall circumference of the support cone to be reduced while inserting its front wall 162 in the bore defined by innermost perimeter 134 of inner bearing ring 130, thereby facilitating assembly of the bearing assembly. As well, the gap facilitates insertion of the steering shaft that is to be supported by the bearing during installation. Once inward force on the outer surface of support cone 160 is released, the cone springs back outwardly to its unbiased position, thereby reforming the gap.

As shown, the present embodiment of support cone 160 further includes a cylindrical rear wall 170 that is connected to front wall 162 by an annular face 166, annular face 166 lying in a plane that is transverse to the longitudinal center axis of support cone 160. The outer surface of rear wall 170 includes a frusticonical surface 172 that is configured to abut outer surface 138 of inner bearing ring 130, and the inner surface of rear wall 170 defines an annular groove 174 that is configured to receive spring ring 180. Preferably, annular groove 174 includes an orientation device (not shown), similar to orientation device 376 shown in FIG. 5, that is received by a gap formed between opposing end portions of spring ring 180. The orientation device is positioned within annular groove 174 so that the gap defined by spring ring 180 is 180° out of phase with the gap that extends the axial length of support cone 160. Spring ring 180 exerts force radially outwardly on rear wall 170 of support cone 160, thereby enhancing the unitization of the bearing assembly components.

Referring now to FIG. 2, a second embodiment of a support bearing assembly 200 in accordance with the present disclosure shown. The second embodiment is substantially similar to the first embodiment, with similar elements having similar reference numbers, only the first numeral of each being different. The second embodiment differs only from the previously discussed first embodiment in that rear wall 270 of support cone 260 does not define an annular groove on its inner surface for receiving spring ring 280. Rather, spring ring 280 of the second embodiment is received adjacent annular face 266 of support cone 260 such that it exerts force radially outwardly against the bases of the various segments of the support cone's front wall 262. Note, an orientation device 268 depends outwardly from annular face 266 and is configured to be received in a gap (not shown) defined between the two opposed end portions of spring ring 280. As previously noted, anti-rotation feature 268 ensures that the gap in spring ring 280 is out of phase with the gap (not shown) that extends along the length of support cone 260. Additionally, a plurality of tabs 267 extend inwardly from corresponding segments of front wall 262 of the support cone to axially retain spring ring 280 adjacent annular face 266. Note, the first embodiment shown in FIG. 1 includes these same features, which allows for a spring ring to be positioned in one, or both, positions.

Referring now to FIGS. 3 through 5, a third embodiment of a support bearing assembly 300 in accordance with the present disclosure is shown. The third embodiment has various elements in common with the previously described embodiments. Those elements have similar reference numbers, with only the first numeral of each being different. The third embodiment of support bearing assembly 300 differs primarily from the first two embodiments in that spring ring 380 includes a plurality of outwardly depending retention features, or loops 382, that function to axially retain support cone 360 on inner bearing ring 330. More specifically, as best seen in FIG. 4, spring ring 380 is received adjacent the inner surface of front wall 362 of support cone 360 such that each loop 382 extends outwardly through a corresponding slot 369 defined by a corresponding retention tab 367. Each loop 382 extends radially outwardly beyond an innermost perimeter 334 of inner bearing ring 330. As such, loops 382 axially retain support cone 360 rather than the plurality of third clips 364 that depend outwardly from front wall 362 of the support cone, as in the previously described embodiments. As such, the plurality of third clips 364 is not needed and may be omitted if desired. In short, support cone 360 is now axially retained by the metal-to-metal engagement of the plurality of loops 382 with inner bearing ring 330. As best seen in FIG. 5, spring ring 380 includes an orientation device 376 that is received in a gap 384 defined between opposing end portions 386 and 388 of the spring ring, similar to the previously discussed embodiments.

Figure 7:
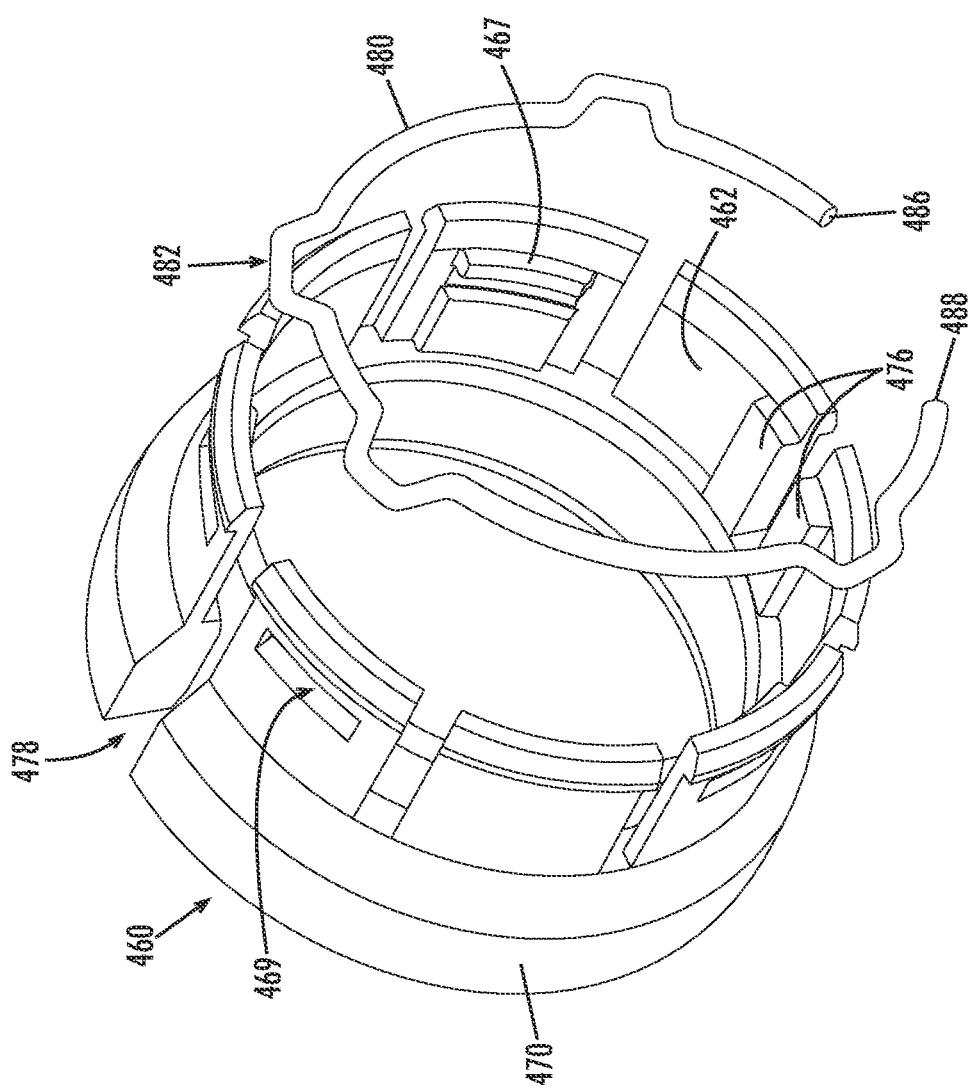
FIG. 7 is a perspective view of the thrust cone and snap ring of the steering column support bearing shown in FIG. 6.

Referring now to FIGS. 6 and 7, a fourth embodiment of a support bearing assembly 400 in accordance with the present disclosure shown. The fourth embodiment has various elements in common with the previously described embodiments. Those elements have similar reference numbers, with only the first numeral of each being different. Similarly to the third embodiment, the fourth embodiment of support bearing assembly 400 includes a spring ring 480 having a plurality of outwardly depending retention features, or loops 482. However, rather than axially retaining support cone 460 on inner bearing ring 430, loops 482 of spring ring 480 axially retain support cone 460 on outer bearing ring 420. More specifically, as best seen in FIG. 6, spring ring 480 is received adjacent the inner surface of front wall 462 of support cone 460 such that each loop 482 extends outwardly through a corresponding slot 469 defined in a corresponding retention tab 467. Note, however, unlike the previously discussed third embodiment, each slot 469 is disposed on front wall 462 such that when support cone 460 is fully received within the bearing assembly, each slot 469 is positioned axially beyond the forward edge of outer bearing ring 420, which in turn defines innermost perimeter 426. Additionally, each loop 482 extends radially outwardly beyond innermost perimeter 426 of outer bearing ring 420. As such, loops 482 axially retain support cone 460 rather than the plurality of third clips 464 that depend outwardly from front wall 462 of the support cone. As such, the plurality of third clips 464 is not needed and may be omitted if desired.

Note, also, that in the present embodiment inner bearing ring 430, cage 440 and roller elements 454 are axially retained between outer raceway 422 and frustoconical surface 472 of the support cone's rear wall 470. Since loops 482 of spring ring axially retain support cone 460 relative to outer bearing ring 420, neither of the bearing cage's axial retention features, more specifically, the previously discussed first and second pluralities of clips, are required and may be omitted if desired. In short, all elements of the bearing assembly are axially retained by the metal-to-metal engagement of the plurality of loops 482 with outer bearing ring 420. As best seen in FIG. 7, similarly to the previously discussed embodiments, spring ring 480 also includes an orientation device 476 that is received in a gap 484 defined between opposing end portions 486 and 488 of the spring ring.

While one or more preferred embodiments of the invention are described above, it should be appreciated by those skilled in the art that various modifications and variations can be made in the present invention without departing from the scope and spirit thereof. It is intended that the present invention cover such modifications and variations as come within the scope and spirit of the appended claims and their equivalents.

What is claimed is:

1. A bearing assembly for supporting a steering shaft within a steering column tube, comprising:
   an outer bearing ring defining an outer raceway;
   an inner bearing ring defining an inner raceway;
   a plurality of roller elements disposed between the inner raceway and the outer raceway;
   a support cone including an inner surface defining an annular groove and an outer surface, the support cone being disposed radially inwardly of, and in contact with, the inner bearing ring, and
   a spring ring disposed adjacent the inner surface of the support cone in the annular groove,
   wherein the spring ring exerts force radially-outwardly against the inner surface of the support cone.

2. The bearing assembly of claim 1, further comprising a bearing cage defining a plurality of roller pockets, each roller pocket receiving one of said plurality of roller elements, the bearing cage being disposed between the inner bearing ring and the outer bearing ring.

3. The bearing assembly of claim 1, wherein the spring ring is comprised of spring steel.

4. The bearing assembly of claim 1, wherein the spring ring further comprises at least one retention feature extending radially outward beyond the outer surface of the support cone, the retention feature extending radially outward beyond an innermost perimeter of the inner bearing ring so that the support cone is secured to the inner bearing ring in the axial direction.

5. The bearing assembly of claim 4, wherein the at least one retention feature extends outwardly through a slot defined by the support cone, the slot extending from its inner surface to its outer surface.

6. The bearing assembly of claim 4, wherein the at least one retention feature further comprises an outwardly depending loop formed by a portion of the spring ring.

7. The bearing assembly of claim 1, wherein the spring ring further comprises at least one retention feature extending radially outward beyond the outer surface of the support cone, the retention feature extending radially outward beyond an innermost perimeter of the outer bearing ring so that the support cone is secured to the outer bearing ring in the axial direction.

8. The bearing assembly of claim 7, wherein the at least one retention feature extends outwardly through a slot defined by the support cone, the slot extending from its inner surface to its outer surface.

9. The bearing assembly of claim 7, wherein the at least one retention feature further comprises an outwardly depending loop formed by a portion of the spring ring.

10. A bearing assembly for supporting a steering shaft within a steering column tube, comprising:
   an outer bearing ring defining an innermost perimeter and outer raceway;
   an inner bearing ring defining an innermost perimeter and inner raceway;
   a plurality of roller elements disposed between the inner raceway and the outer raceway;
   a bearing cage having an intermediate portion defining a plurality of roller pockets, each roller pocket receiving one of said plurality of roller elements, a front wall with at least one retention tab extending radially outward therefrom, and a rear wall with at least one retention tab extending radially inward therefrom, the at least one retention tab of the front wall extending outward beyond the innermost perimeter of the outer bearing ring and the retention tab of the rear wall extending inward beyond the outermost perimeter of the inner bearing ring;
   a support cone defining an inner surface, an outer surface, a front wall, a rear wall, and an annular face that is transverse to a longitudinal center axis of the support cone and disposed between the front wall and rear wall, the support cone being disposed radially inwardly of, and in contact with, the inner bearing ring, and
   a spring ring disposed adjacent both the inner surface of the support cone and its annular face,
   wherein the spring ring exerts force radially-outwardly against the inner surface of the support cone.

11. The bearing assembly of claim 10, wherein the spring ring is comprised of spring steel.

12. The bearing assembly of claim 10, the support cone further comprising at least one projection extending radially inward from the front wall, wherein a portion of the spring ring is disposed between the annular face and the projection so that the spring ring is axially retained relative to the support cone.

13. The bearing assembly of claim 10, wherein the spring ring further comprises at least one retention feature extending radially outward beyond the outer surface of the support cone, the retention feature extending radially outward beyond the innermost perimeter of the inner bearing ring so that the support cone is secured to the inner bearing ring in the axial direction.

14. The bearing assembly of claim 13, wherein the at least one retention feature extends outwardly through a slot defined by the support cone, the slot extending from its inner surface to its outer surface.

15. The bearing assembly of claim 13, wherein the at least one retention feature further comprises an outwardly depending loop formed by a portion of the spring ring.

16. The bearing assembly of claim 10, wherein the spring ring further comprises at least one retention feature extending radially outward beyond the outer surface of the support cone, the retention feature extending radially outward beyond the innermost perimeter of the outer bearing ring so that the support cone is secured to the outer bearing ring in the axial direction.

17. The bearing assembly of claim 16, wherein the at least one retention feature extends outwardly through a slot defined by the support cone, the slot extending from its inner surface to its outer surface.

18. The bearing assembly of claim 16, wherein the at least one retention feature further comprises an outwardly depending loop formed by a portion of the spring ring.

19. The bearing assembly of claim 16, wherein at least one retention feature axially fixes the outer bearing ring, the inner bearing ring, the bearing cage, the plurality of roller elements and the support cone with respect to each other.

* * * * *